(12) United States Patent
Weinert et al.

(10) Patent No.: US 7,746,005 B2
(45) Date of Patent: Jun. 29, 2010

(54) CIRCUIT ARRANGEMENT AND METHOD FOR THE OPERATION OF A HIGH-PRESSURE GAS DISCHARGE LAMP

(75) Inventors: Holger Weinert, Aachen (DE); Anatoli Saveliev, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 171 days.

(21) Appl. No.: 11/814,683

(22) PCT Filed: Jan. 16, 2006

(86) PCT No.: PCT/IB2006/050141

§ 371 (c)(1),
(2), (4) Date: Jul. 25, 2007

(87) PCT Pub. No.: WO2006/079937

PCT Pub. Date: Aug. 3, 2006

(65) Prior Publication Data

US 2008/0129205 A1 Jun. 5, 2008

(30) Foreign Application Priority Data

Jan. 28, 2005 (EP) .................................. 05100563

(51) Int. Cl.
*H05B 37/02* (2006.01)
(52) U.S. Cl. ................................ 315/291; 315/209 CD; 315/241; 315/290

(58) Field of Classification Search ................... 313/17, 313/25, 111, 112, 113, 114, 116, 117, 315, 313/318.04, 318.07, 318.12, 331, 332, 341, 313/344, 346 R, 468, 485, 486, 487, 488, 313/489, 490, 491, 493, 547, 552, 555, 556, 313/557, 569, 570, 571, 572, 573, 579, 580, 313/620, 623, 624, 625, 628, 630, 631, 632, 313/633, 634, 635, 636, 637, 638, 639, 641, 313/642; 315/39, 58, 71, 77, 82, 101, 174, 315/194, 199, 200 R, 201, 205, 207, 208, 315/209 R, 219, 224, 226, 227 R, 240, 241 R, 315/242, 244, 245, 247, 248, 267, 276, 278, 315/284, 289, 290, 291, 307, 308, 311, 326, 315/344, DIG. 2, DIG. 4, DIG. 5, DIG. 7

See application file for complete search history.

(56) References Cited

U.S. PATENT DOCUMENTS 4,724,362 A 2/1988 Lester
(Continued)

FOREIGN PATENT DOCUMENTS

WO 8701554 3/1987

*Primary Examiner*—Douglas W Owens
*Assistant Examiner*—Jae K Kim (57) ABSTRACT

A circuit arrangement for operating a high-pressure gas discharge lamp has an igniting-circuit circuit arrangement having a capacitor able to be connected via two terminals to a voltage supply unit. The capacitor is connected in parallel with a primary winding of a transformer by a switching element that becomes conductive above a given voltage. The circuit arrangement also has a lamp-circuit circuit arrangement in which the high-pressure gas discharge lamp is connected on one side, via a secondary winding of the transformer, to a terminal for connection to the voltage supply unit. The other side of lamp-circuit is connected, via an inductive element, to a second terminal for connection to the voltage supply unit. The inductive element is formed by an air core inductor or rod core inductor that is exposed or is encapsulated in an insulating substance and that has an inductance equal to or less than 20 μH.

14 Claims, 5 Drawing Sheets

U.S. PATENT DOCUMENTS

| | | | |
|---|---|---|---|
| 4,841,196 A * | 6/1989 | Waymouth | 315/65 |
| 5,563,474 A | 10/1996 | Wessels et al. | |
| 5,726,537 A | 3/1998 | Huber et al. | |
| 5,889,370 A | 3/1999 | Arai et al. | |
| 5,892,332 A * | 4/1999 | Drews et al. | 315/209 CD |
| 5,962,981 A | 10/1999 | Okude et al. | |
| 5,982,253 A | 11/1999 | Perrin et al. | |
| 5,986,413 A | 11/1999 | Zijlman | |
| 6,043,614 A | 3/2000 | Tessnow et al. | |
| 6,392,363 B1 * | 5/2002 | Decker | 315/289 |
| 6,734,640 B2 * | 5/2004 | Ribarich et al. | 315/291 |

* cited by examiner

CIRCUIT ARRANGEMENT AND METHOD FOR THE OPERATION OF A HIGH-PRESSURE GAS DISCHARGE LAMP

The invention relates to a circuit arrangement and a method for operating a high-pressure gas discharge lamp. The invention also relates to a lamp unit having a high-pressure gas discharge lamp and a circuit arrangement of this kind, and to a headlight having such a lamp unit.

High-pressure gas discharge lamps of this kind comprise in essence a discharge vessel into which two electrodes, which are generally arranged at opposite ends of the discharge vessel, project, which electrodes, in seal portions arranged on the discharge vessel, are connected to input conductors via which, for the supply of voltage, the lamp can be connected to the circuit arrangement. The discharge vessel is filled at relatively high pressure with a gas, generally an inert gas or a mixture of inert gases. Typical examples of high-pressure gas discharge lamps of this kind are MPXL (Micro Power Xenon) lamps. Lamps of this kind are used above all for vehicle headlights. The arc that is ignited in such lamps produces a high temperature that causes the inert gases and, essentially, the added substances such as mercury and mixtures of metal halides, to emit light. The discharge vessel is usually surrounded by an outer envelope whose purpose is to absorb the ultraviolet radiation that, because of the physical processes in the arc in the discharge vessel, is necessarily generated in addition to the light in the desired region of the wavelength spectrum. The arc in the lamp is generally ignited by applying a pulse of high voltage. The light yield of such lamps is generally all the higher the higher is the pressure of the gas present in the discharge vessel. However, an unfortunate effect of a higher pressure for the gas is that a higher breakdown voltage is also required, i.e., at a higher pressure, a higher voltage has to be applied to the electrodes of the lamp to ignite the lamp. The breakdown voltage is, as a rule, a plurality of thousands of volts, and in the latest generation of gas discharge lamps for example it is of the order of 20 kV. As soon as the lamp has ignited, it has to be changed over into a steady-state mode in what is termed a "transfer" process. During the transfer, the electrodes of the lamp are heated to the temperatures that are typical of the steady-state mode. To maintain the arc during the transfer and in the steady-state mode, a considerably lower voltage is required. What are applied to the electrodes in this case are typically voltages in the range of a few hundreds of volts for the transfer and of less than 100 volt in the steady-state mode.

Consequently, a special circuit arrangement is required firstly to ignite the high-pressure gas discharge lamp and then not to prevent operation in the steady-state mode. A circuit of this kind is generally referred to as an "igniting module".

A circuit arrangement of this kind usually comprises two different circuits or sub-circuit arrangements. On the one hand, a circuit arrangement of this kind normally has an igniting-circuit circuit arrangement (also referred to in what follows as "igniting circuit" for short), the purpose of which is to generate the high-voltage pulse to ignite the high-pressure gas discharge lamp. Situated in the igniting circuit is a capacitor that can be connected via two terminals to a voltage supply unit (normally also referred to as a "ballast"). Via a switching element, such as a spark gap or a thyristor for example, this capacitor is connected to a primary winding of a transformer, i.e. the connection of the capacitor to the primary winding is broken at one point by the switching element concerned.

The circuit arrangement also usually has a lamp-circuit circuit arrangement (also referred to in what follows as a "lamp circuit" for short) that is used for the transfer and for the steady-state mode of the high-pressure gas discharge lamp. In this lamp circuit, the high-pressure gas discharge lamp is connected on one side, via a secondary winding of the transformer, to a terminal for connection to the ballast, and on the other side—via what is termed a return conductor—to a second terminal for connection to the ballast, i.e. the secondary winding of the high-voltage transformer is connected in series with the high-pressure gas discharge lamp. The high-pressure gas discharge lamp and the source of high voltage (the secondary winding of the transformer) are thus connected in series and to the ballast. For this reason, a circuit arrangement of this kind is referred to as a "series igniting module" or a "series igniter". It is via this lamp circuit that the high-pressure gas discharge lamp is supplied by the ballast with the requisite operating voltage in the steady-state mode, in which case the secondary winding of the transformer can be regarded simply as a length of conductor of low resistance and low inductance. The winding does not perform any special function in this mode of operation.

The igniting of the high-pressure gas discharge lamp takes place in the following steps. The capacitor in the igniting circuit, which capacitor is connected in parallel with the primary winding of the transformer by the switching element, is first charged by the ballast. The switching element may, in this case, switch to conduct above a voltage specific thereto but, if the ballast is of a suitable design, it may also be controlled at a given time in such a way that it switches to conduct. Consequently, in the present example, the switching voltage above which the switching element switches to conduct is preset by the ballast. As soon as a given voltage is reached at the capacitor, the capacitor discharges through the switching element into the primary winding of the high-voltage transformer. The discharge of the capacitor into the primary winding of the transformer in the lamp circuit produces the desired high-voltage pulse, which then causes the lamp to ignite. As soon as the breakdown in the lamp has taken place, the lamp is supplied with electrical energy by the ballast, through the secondary winding of the transformer and via the return conductor, in such a way that it is changed over into the steady-state mode. In the steady-state mode, the igniting circuit and the associated components do not perform any further function until the lamp has to be restruck. An example of a circuit of this kind is described in U.S. Pat. No. 5,986,413.

However, there is a problem with designs of this sort in that, because of the extremely fast change in high-voltage potential within the circuit arrangement, a transient pulse with a duration of only a few nanoseconds and an amplitude of some hundreds of volts is generated. Voltages of up to more than 1000 volt are reached at the terminals of the igniting module in this case. This transient pulse is also usually referred to as a "glitch". A glitch pulse of this kind may propagate along the connecting line in the direction of the ballast and damage or even totally destroy the ballast or components thereof. This problem occurs particularly when the lamp is being started cold.

It is an object of the present invention to further develop a circuit arrangement and a method of the kind specified in the opening paragraph in such a way that the risk of other electrical components that are in contact with the circuit arrangement or are situated in the vicinity thereof being destroyed, and in particular the risk of the ballast being destroyed, which risks are caused by the fast change in high-voltage potential occurring during the igniting, are considerably reduced or are largely prevented.

For this purpose, there is connected on the side of the high-pressure gas discharge lamp opposite from the secondary winding (the low-voltage side), i.e. to the electrode that is not connected to the secondary winding of the high-voltage transformer, an inductive element in the form of an air core inductor or a rod core inductor having an inductance $\leqq 20\,\mu H$.

As will be explained in greater detail below, it has been found in numerous, costly studies that the parameters of the glitch pulse are significantly dependent on certain parasitic capacitances in the circuit arrangement or between the circuit arrangement and the surroundings. Surprising, it was also found in this case that the glitch pulse is sufficiently reduced to reliably prevent any damage to the voltage supply unit with a simple air core inductor or rod core inductor having an appropriate value of inductance of $\leqq 20\,\mu H$. Because the inductive element is an air core inductor or rod core inductor, it is ensured that an inductive element of this kind does not go into saturation even at quite high currents. Due to their saturation characteristics at high currents, inductive elements having a closed magnetic circuit, such for example as toroidal core inductors or ferrite beads, on the other hand have proved to be of only limited suitability for the purpose mentioned of protecting the ballast against the effects of a glitch pulse. What is meant by an "air core inductor" is, for the purposes of the present invention, any inductor that is filled not with a magnetic material but simply with air or some other dielectric, e.g., to increase the dielectric strength, with a dielectric filling compound.

It has also been found that, when inductive elements having an inductance of more than 20 μH are used, the high voltage on the conductor between the high-pressure gas discharge lamp and the air core or rod core inductor does not decay sufficiently fast and the probability is thus increased of there being a flashover between the return conductor of the high-pressure gas discharge lamp, which is at a high potential shortly after the ignition, and other items in the surroundings of the lamp, which flashover might then result in damage to the coating of the headlight reflector of the motor vehicle and in other undesirable optical effects in its headlight system.

The dependent claims each deal with particularly advantageous embodiments and refinements of the invention. The method too for the operation of a high-pressure gas discharge lamp may, in particular, be put into practice in ways similar to those that are specified in the dependent claims for the circuit arrangement.

It is particularly preferable for the inductance of the inductive element to be less than approximately 5 μH and, as a particular preference, to be 1 μH. It has been found in a large number of series of tests that even air core or rod core inductors having inductances of less than 5 μH, and in particular having an inductance of 1 μH, are enough to reduce, i.e. modify, the glitch pulse sufficiently to enable damage to the ballast to be ruled out. On the other hand, with low inductances of this kind on the return conductor, the potential that occurs in the lamp is very quickly reduced, thus enabling flashovers between the return conductor and surrounding components to be reliably prevented.

What is particularly preferred as an inductive element is a rod core inductor having an a rod core of high-frequency ferrite, because an inductive element of this kind is optimum in respect of its efficiency and an inductor can thus be used that is of small structural outside dimensions.

Basically, the lamp circuit and the igniting circuit—leaving aside the shared high-voltage transformer—may be two separate circuits that have terminals of their own for connection to the ballast. In principle, it would also be possible for a separate ballast of its own to be provided for each of the circuits.

It is particularly preferred however for the circuit arrangement to have only three terminals for connection to a ballast and to be of a form such, in this case, that, in forming the igniting-circuit circuit arrangement, a first terminal is connected to the capacitor and to the primary winding of the transformer, and a second terminal is connected to the other terminal of the capacitor and, via the switching element, to the other end of the primary winding. In forming the lamp-circuit circuit arrangement, the first terminal is then also connected, via the secondary winding of the transformer, to one side of the high-pressure gas discharge lamp, i.e. to a first electrode, which high-pressure gas discharge lamp is connected in turn on the other side, i.e. by its second electrode, via the said inductive element to the third terminal. This design is more economical of space than a design having separate circuits and in particular requires fewer terminals.

Regardless of whether the circuit arrangement used is one that has two separate circuits having a total of four terminals or is the above-mentioned preferred circuit arrangement having only three terminals, in a preferred embodiment the terminals of the lamp circuit are connected together via a voltage-limiting element that also becomes conductive at a high voltage, such for example as a transit diode or Zener diode. This voltage-limiting element may likewise assist in reducing the high voltage between the terminals of the lamp circuit as quickly as possible after the ignition, and thus in reducing the risk of a failure of the ballast. Alternatively, instead of a transit or Zener diode, what may also be used for this purpose is a suitable capacitive element, such for example as a capacitor having a capacitance from a few hundreds of pF to a few nF.

Basically, a circuit arrangement according to the invention may be constructed separately from the high-pressure gas discharge lamp and may have appropriate terminals to which the high-pressure gas discharge lamp is detachably connected. What this means is that the high-pressure gas discharge lamp can then be replaced separately from the circuit arrangement.

As a particular preference however, the high-pressure gas discharge lamp forms, with the circuit arrangement, a lamp unit that can be fitted as one complete unit to, for example, the headlight of a motor vehicle and that can also be replaced as a shared component. The bulk of the circuit arrangement is preferably incorporated in a base-housing of the high-pressure gas discharge lamp in this case.

A lamp unit of this kind is usually also referred to as a "lamp with integral igniting module". The inductive element that is used in accordance with the invention is preferably also arranged in the base-housing in this case. In another variant that is perfectly possible, the inductive element is incorporated directly into a return conductor that runs back to the base-housing in which the other components of the circuit arrangement are situated, from an electrode of the high-pressure gas discharge lamp that is arranged remotely from the base-housing.

These and other aspects of the invention are apparent from and will be elucidated with reference to the embodiments described hereinafter. The same components are identified by the same reference numerals in the drawings.

Figure 1:
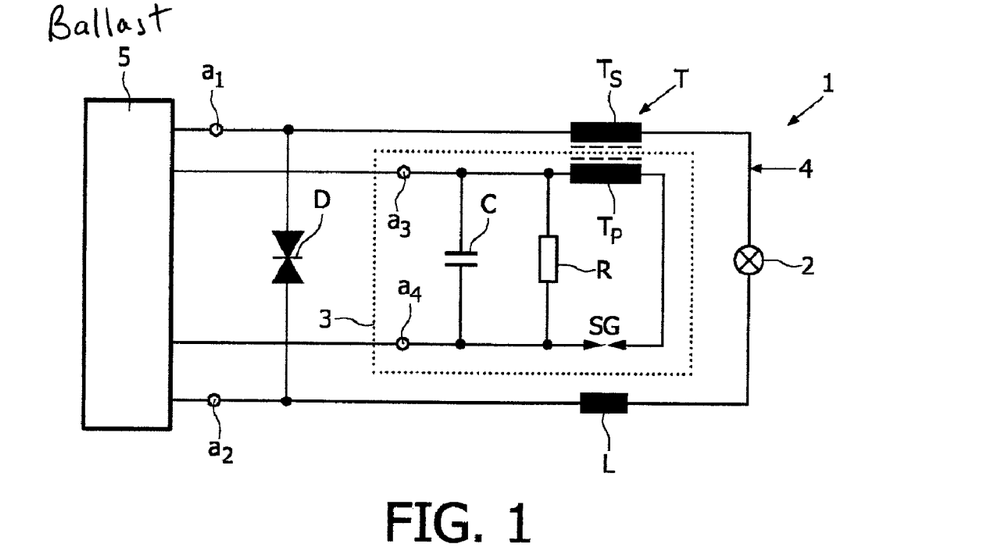
FIG. 1 is a simplified circuit diagram of a first embodiment of lamp arrangement according to the invention having a separate igniting circuit and lamp circuit.

The embodiment of a circuit 1 according to the invention that is shown in FIG. 1 is a layout in which the igniting circuit 3 and the lamp circuit 4 each have two terminals of their own $a_3$, $a_4$ and $a_1$, $a_2$. What this means is that, leaving aside the transformer T whose primary winding $T_P$ is arranged in the igniting circuit 3 and whose secondary winding $T_S$ is arranged in the lamp circuit 4, the lamp circuit 4, which is the outer circuit in FIG. 1, and the igniting circuit 3, which is the inner circuit, are completely separate from one another. This layout is therefore somewhat less complicated and easier to understand than the layout shown in FIG. 2.

Via the terminals $a_1$, $a_2$, $a_3$, $a_4$, the lamp circuit 4 and the igniting circuit 3 are each connected to a ballast 5. The ballast 5 is shown only in schematic form in FIGS. 1 and 2. The circuit arrangement 1 connected between the ballast 5 and the high-pressure gas discharge lamp 2 is usually also referred to as an "igniting module".

The lamp circuit 4 in FIG. 1 comprises in essence the secondary winding $T_S$ of the high-voltage transformer T and the high-pressure gas discharge lamp 2, which are connected in series, and an inductive element L which is connected on the side of the high-pressure gas discharge lamp 2 opposite from the secondary winding $T_S$. In accordance with the invention, this inductive element L is an air core inductor or rod core inductor having an inductance $\leq 20$ µH. The terminals $a_1$, $a_2$ of the lamp circuit 4 are also connected together by a transit diode D. As has already been mentioned above, a capacitor having a capacitance of from a few hundred pF to a few nF may be used in place of the transit diode.

What is first connected to the terminals $a_3$, $a_4$ of the igniting circuit 3 is a capacitor C. Connected in parallel with the latter is a resistor R. At one end, the capacitor C is connected directly to the first terminal of the primary winding $T_P$ of the transformer T. At the other end, the capacitor C is connected via a switching element, which in this case is a spark gap (SG), to the second terminal of the primary winding $T_P$. Apart from the break caused by the spark gap SG, the capacitor C is thus, in a certain sense, also connected in parallel with the primary winding $T_P$ of the transformer T.

Figure 2:
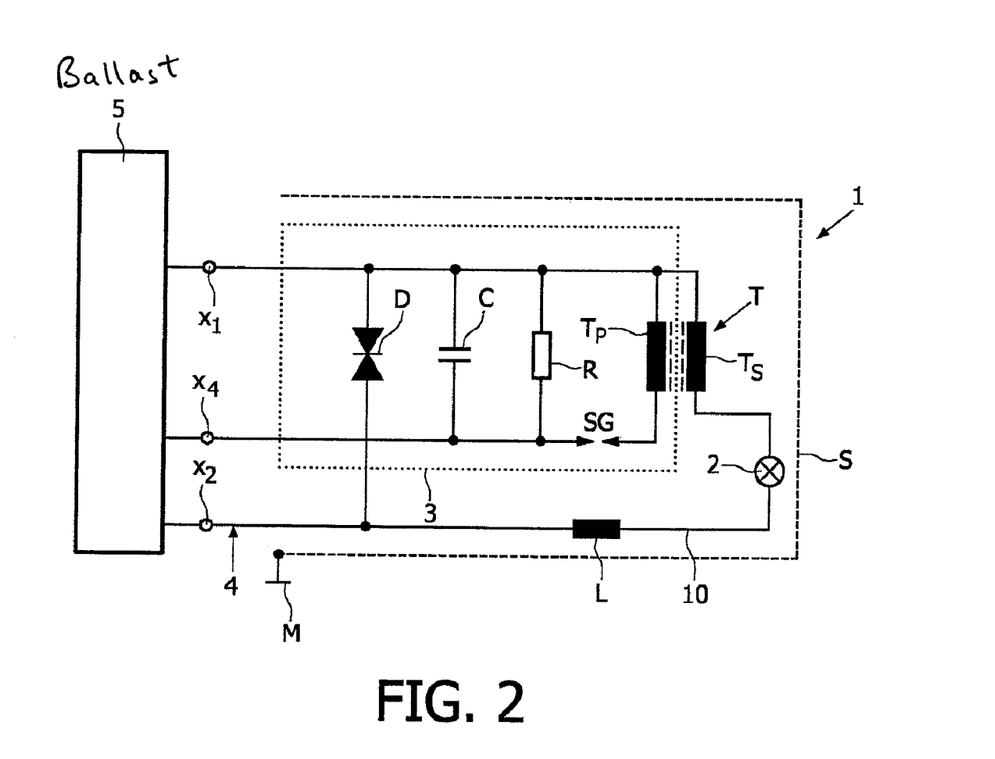
FIG. 2 is a simplified circuit diagram of a second embodiment of the invention having a reduced number of terminals.

FIG. 2 shows an alternative layout in which only three terminals $x_1$, $x_2$, $x_4$ are required for both circuits, i.e. for the igniting circuit and the lamp circuit. What will be taken as a basis in what follows will be principally the layout for the igniting module that is shown in FIG. 2, without limiting the invention thereto.

There is formed in this case, between the terminals $x_1$ and $x_4$, an igniting circuit 3 that is formed, substantially in the same way as the layout shown in FIG. 1, by a capacitor C, a resistor R arranged in parallel with the latter and the primary winding $T_P$ of the high-voltage transformer T, which primary winding $T_P$ is connected in parallel with the first two components mentioned, the capacitor C once again being connected to the primary winding $T_P$ via a spark gap SG.

However, the first terminal $x_1$ is, at the same time, also connected to the secondary winding $T_S$ of the transformer T, which latter is on the other hand once again connected in series with the high-pressure gas discharge lamp 2, and also with an inductive element L selected in accordance with the invention, to form the lamp circuit 3. On its other side the inductive element L is connected, by the terminal that points away from the lamp 2, to the terminal $x_2$. The terminals $x_1$, $x_2$, $x_4$ of this series igniting module are connected in turn to a ballast 5.

Also shown in FIG. 2 is an enclosure and/or EMC shield S (EMC=electromagnetic compatibility) of the igniting module, which is at the ground potential M and surrounds both the igniting module and also the lamp 2. As a rule, an enclosure at ground potential is also present in the embodiment shown in FIG. 1.

Figure 3:
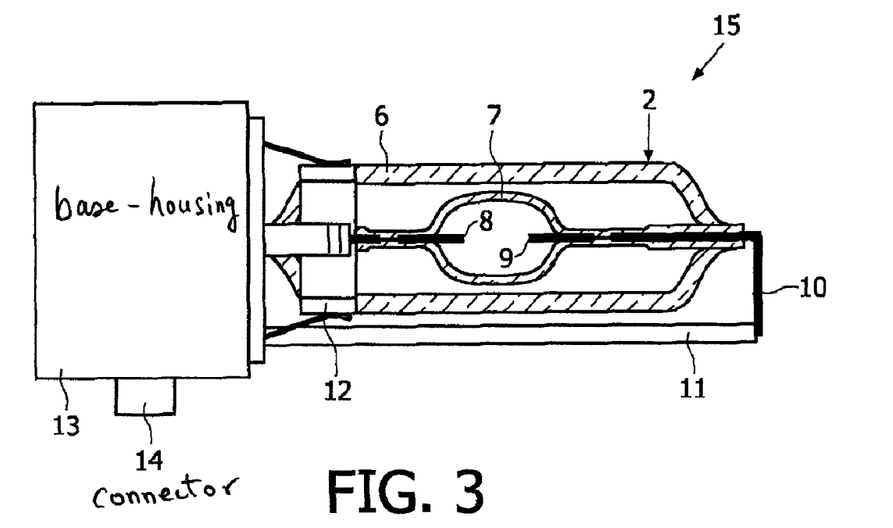
FIG. 3 is a simplified representation of a lamp unit having a high-pressure gas discharge lamp and a circuit arrangement according to the invention that is incorporated in a base-housing of the high-pressure gas discharge lamp.

The mechanical construction of a lamp unit (lamp with integral igniting module) comprising an igniting module of this kind and a lamp is shown in schematic form in FIG. 3. There can be seen here the high-pressure gas discharge lamp 2, which comprises in essence an inner envelope forming the discharge vessel 7, into which two electrodes 8, 9 project from opposite ends. When the lamp 2 is ignited, a spark is struck between the electrodes 8, 9 and an arc then develops between them. Situated in the discharge vessel 7, at a relatively high pressure, is a mixture that normally comprises inert gases and a mixture of metal halides and mercury. (As well as this, there are also mercury-free lamps.) The discharge vessel 7 is surrounded by an outer envelope 6 that serves, amongst other things, as a screen against the UV radiation that is produced in addition to the light radiation that is wanted. The space between the outer envelope 6 and the discharge vessel 7 is preferably evacuated or is filled at a low pressure or normal ambient pressure with air or some other gas or a mixture of gases, such for example as a mixture of inert gases.

By means of an annular mounting 12, the high-pressure gas discharge lamp 2 is held in place by its outer envelope 6 on a base that is incorporated in a base-housing 13. The components of the circuit arrangement 1 are also situated in this base-housing 13. The base of the lamp may be surrounded by a grounded metal shield. Via a connector 14 in the base-housing 13, the igniting module 1 is connected to a ballast (the ballast is not shown in FIG. 3).

That electrode 8 of the lamp 2 that is arranged at the end adjacent the base is connected in the way shown in FIG. 2, via a conductor, to the secondary winding $T_S$ arranged in the base-housing 13. The electrode 9 situated at the end remote from the base is connected to a return conductor 10, which is run back to the base through an electrically insulating tube 11, preferably of ceramic material. In the base-housing 13, the return conductor 10 is connected, as shown in FIG. 2, via the inductive element L in the form of an air core inductor or rod core inductor having an inductance $\leq 20$ µH, to the terminal $x_2$. The inductive element L may also be arranged at any desired position along the return conductor 10. In particular, it is even possible for the inductive element L to be arranged outside the base and inside the ceramic outer sleeve 11 (see FIG. 3), provided said inductive element L is small enough. This may for example be possible if the inductive element L is a small ferrite rod core inductor having an inductance of less that 5 μH.

Because the series igniter shown in FIG. 2 is a preferred layout of the circuit arrangement according to the invention, the operation of the circuit arrangement and the problems that exist with it, or rather the effect of the inductive element L that is used in accordance with the invention in overcoming these problems, will be elucidated by reference to the series igniter shown in FIG. 2. Also, it will be taken as a basis below that the high-pressure gas discharge lamp 2 is an MPXL lamp that is used as a preference. The elucidation given below does however also apply, in a similar way, to a layout as shown in FIG. 1 or similar layouts and also to other types of high-pressure gas discharge lamp.

To ignite the lamp 2, the capacitor C is first charged via the terminals $x_1$ and $x_4$ of the igniting circuit 3. The spark gap SG is sized in such a way that it becomes conductive at approx. 800 volt. The result of this is that the capacitor C, which is charged to up to approx. 800 volt, discharges into the primary winding $T_P$ of the transformer T across the spark gap SG. A high voltage of the order of 20 kV is thus produced in the secondary winding $T_S$ of the transformer and this high voltage is then present, before ignition, on the high-voltage path between the transformer T and the lamp 2. The other side of the lamp 2 is connected by the inductive element L to the terminal $x_2$ of the lamp and before the ignition it is at a fairly low potential.

As a rule, the lamp is started by an igniting pulse. If the lamp 2 does not starts successfully, the capacitor C in the igniting circuit 3 is charged again to enable the lamp to be started with further igniting pulses. As soon as the desired breakdown takes place in the discharge vessel 7, the lamp 2 itself can be regarded as a relatively low-resistance resistor. The lamp 2 is then supplied, via the lamp circuit 4, with an operating voltage that is usual for the design of its driver, such for example as a square-wave voltage of between a few tens and a few hundreds of volts. Respective halves of the nominal voltage may for example be applied to the terminals $x_1$ and $x_2$. Any desired voltage of up to a few hundred volts may be applied to the second terminal $x_4$ of the igniting circuit 3. It is simply that this voltage must not be sufficiently high to make the spark gap SG conductive. In many ballasts, this terminal is at a floating potential. The resistor R in the igniting module, which is generally of high resistance, is fitted in the circuit for safety reasons, in order to suppress any possible residual charge from the capacitor C, thus causing a potential to be maintained at the terminal $x_4$ that approximately corresponds to the potential present at the terminal $x_1$, which prevents the generation of further, unwanted igniting pulses.

A problem with this layout is that, when the high-pressure gas discharge lamp 2 is ignited, very fast and high transient pulses having a rise time of less that 1 ns, a duration of only a few ns and a height of 1000 volt or more may occur on the high-voltage line between the secondary winding $T_S$ of the transformer T and the lamp 2 as a result of the very fast change in potential from approx. 20 kV to a value of less than a few hundred volts, which transient pulses make their way into the ballast 5 via the terminals $x_1$, $x_2$ and $x_4$ and may cause damage or destruction there. It is the terminal $x_2$ that is most affected in this case. To establish the exact cause of this pulse, which is called a glitch pulse, and to discover the possible ways of acting on the parameters of the glitch pulse, a wide range of different measurements were made, and in the course of this the following dependences were found to exist:

Apart from the components shown in FIG. 2, which determine the essential functions of the circuit arrangement 1, there are always a plurality of unavoidable parasitic components that may, under certain circumstances, affect the behavior of the circuit 1. It is true that the majority of such parasitic components do not play any major role, because their values are so low that they can be ignored, but nevertheless some of the parasitic components are responsible for producing the glitch pulse. The mechanism by which the glitch pulse comes into existence is as follows in this case:

As has already been described above, the MPXL lamp 2 is ignited by high-voltage pulses induced in the secondary winding of the transformer. The rise times of the high-voltage pulses are in the range between several tens and a few hundreds of nanoseconds. As a rule, the high-voltage pulses in question are of positive polarity. This however depends on the design of the driver circuit and of the transformer T. Once the voltage has reached the breakdown value of the order of 20 kV, the desired breakdown takes place in the lamp and the lamp ignites.

During the igniting process of the high-pressure gas discharge lamp 2, the resistance of the lamp changes in a few nanoseconds from an almost infinite value to a relatively low value. As a result, the potential on the high-voltage line between the secondary winding $T_S$ and the lamp 2 decays very quickly from approx. 20 kV to a value of less than 100 V. The time in which the high-voltage pulse that produced the ignition decays is determined by the breakdown process in the lamp 2 and is a time of a few nanoseconds. The value dU/dt on the high-voltage line between the secondary winding $T_S$ and the lamp 2 (see FIG. 2) is then of the order of 20 kV/2 ns=$10^{13}$ volt/s. The parasitic capacitances between the high-voltage line and other components of the igniting module and of the shield are very quickly discharged as a result of this, which produces relatively high currents in the connecting lines to the ballast 5, and in particular in the return conductor 10 from the lamp 2 to the terminal $x_2$. The parameters of the over-currents or over-voltages that are caused by the processes described above depend amongst other things on the impedance of the particular connecting line concerned.

Figure 4A:
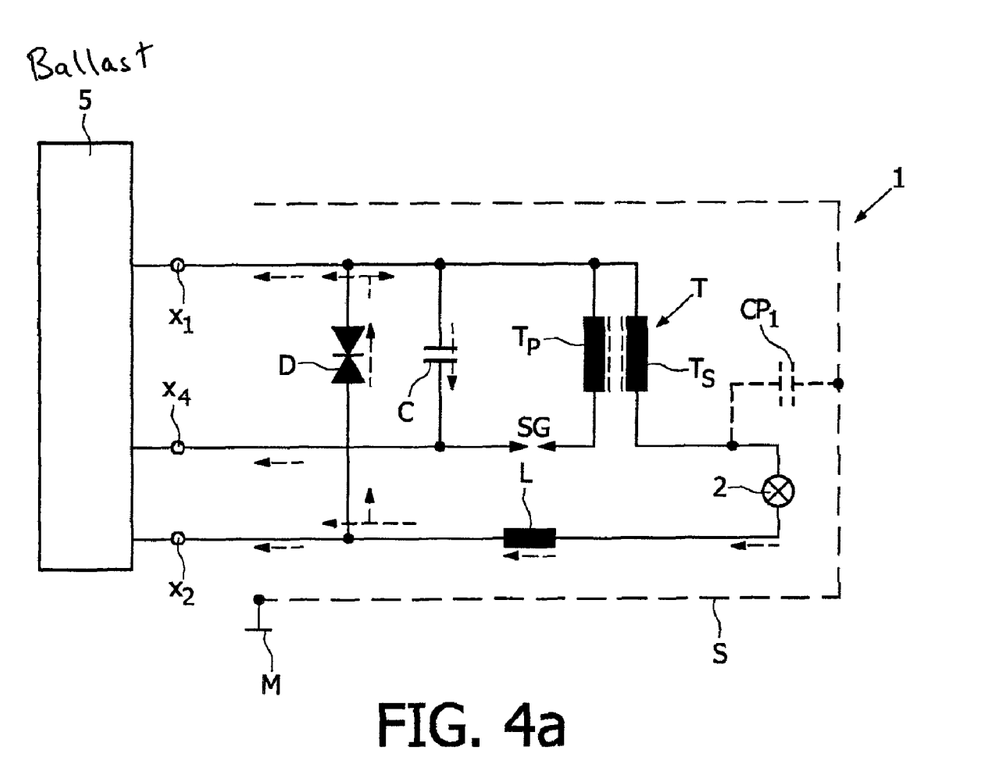
FIG. 4a is a schematic representation of a parasitic capacitance between the circuit arrangement and the surrounding ground, and of the propagation that is thereby caused of a glitch pulse within the circuit arrangement of FIG. 2.

In the special experiments, it was found that it is essentially two parasitic capacitances that play a major part in causing the glitch pulse. The first capacitance is shown as a capacitor $CP_1$ in FIG. 4a and is situated between the high-voltage line from the secondary winding TS to the lamp 2, and the shielding housing of the igniting module or the surrounding ground S. This parasitic capacitor CP1 is charged by the igniting pulse, before the igniting operation, to the igniting voltage of the lamp. Once breakdown takes place in the lamp, the lamp 2 itself can be regarded as a relatively low-resistance resistor in the circuit 1. The positively charged end of the capacitor $CP_1$, which capacitor CP1 is charged to a high voltage, is then connected by the lamp 2 to other parts of the circuit arrangement. The possible directions in which the glitch pulse caused by the capacitor $CP_1$ may propagate in the direction of the terminals $x_1$, $x_2$, $x_4$ and, in the end, in the direction of the ballast 5 are indicated by arrows in FIG. 4. The load is heaviest on the terminal $x_4$ in this case. The existence of this capacitance was demonstrated in experiments in which the igniting module and the lamp were covered by an additional shield at the points that came under suspicion, at which points there was to be an abrupt charge in the high-voltage potential. The additional shield was electrically isolated from the usual shielding S and was connected to the return conductor, the additional shielding being situated underneath the usual shielding S. This step led to the considerable reduction in the amplitude of the glitch pulse, the polarity of the glitch pulse being the same at the terminals $x_1$ and $x_2$ before the change and having altered after the change. From this, it could be concluded that a second parasitic capacitance existed in the layout of the igniting module.

Figure 4B:
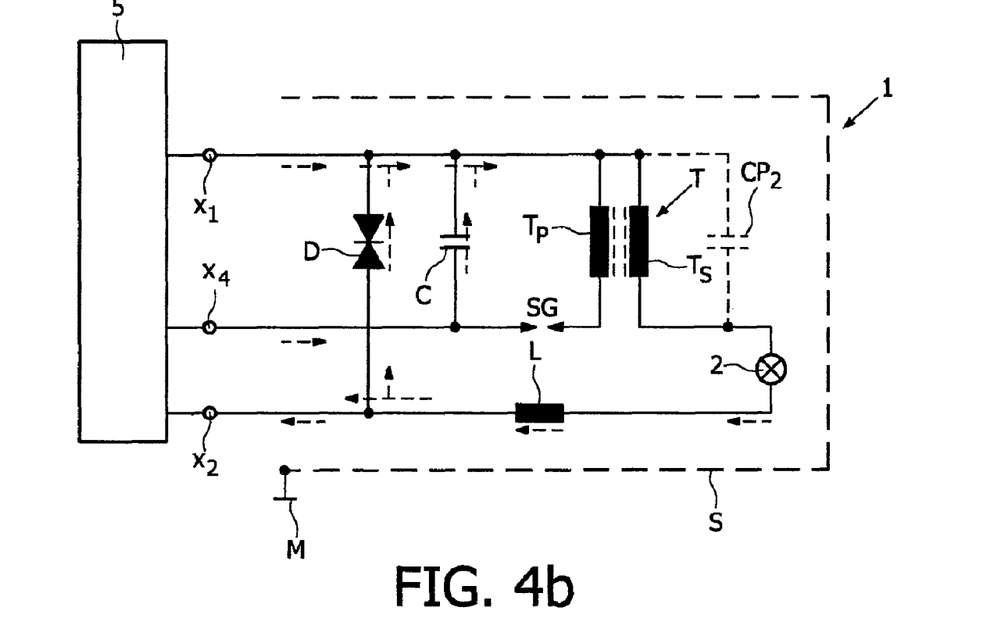
FIG. 4b is a schematic representation of a parasitic capacitance in parallel with the secondary winding of the transformer, and of the propagation that is thereby caused of a glitch pulse within the circuit arrangement of FIG. 2.

The second parasitic capacitance that is mainly responsible for the glitch pulse is the capacitance of the secondary winding $T_S$ itself. This capacitance is shown in FIG. 4b as a capacitor $CP_2$ parallel to the secondary winding $T_S$. This capacitor $CP_2$ is likewise charged to the breakdown voltage during the rise of the igniting pulse. After the breakdown in the lamp 2, the positively charged end of this capacitor $CP_2$ is also connected to the return conductor 10 (FIG. 3) of the lamp 2. The negative end of the parasitic capacitor $CP_2$ (if the igniting pulse is one of positive polarity; otherwise this end of the capacitor is at positive potential), is connected directly to the terminal $x_1$ and indirectly, by the capacitor C, the primary winding $T_P$ and the spark gap SG, to the terminal $x_4$. Part of the energy from this parasitic capacitor $CP_2$ is absorbed by the transit diode D. The existence of this capacitance was demonstrated in experiments in which the transit diode D was removed. As a result, a considerable increase in the amplitude of the glitch pulse was observed at all the terminals of the igniting module, the polarity of the pulses at the terminals $x_1$ and $x_4$ being the reverse of the polarity at the terminal $x_2$.

Figure 6A:
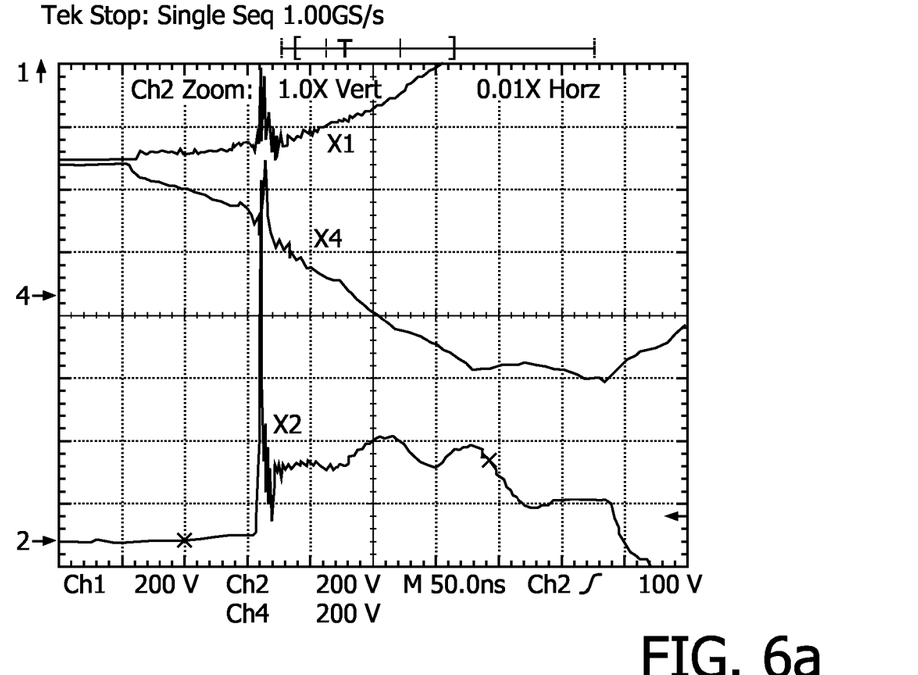
FIG. 6a is an oscilloscope trace of a glitch pulse that occurs at the terminals of a conventional circuit arrangement similar to that shown in FIG. 2.

The actual glitch pulse occurs as a result of a superimposition of the effects of the two parasitic capacitors $CP_1$, $CP_2$, the load being heaviest at the terminal $x_2$. The pulses measured at the terminals $x_1$ and $x_4$ have lower peak values for current and voltage. This can be seen from FIG. 6a. FIG. 6a shows an oscilloscope trace for a glitch pulse on a 50 m long 50Ω co-axial connecting cable between the ballast 5 and the MPLX lamp 2 at a point approx. 20 cm away from the lamp 2, a standard toroidal core ferrite inductor having an inductance of approx. 20 μH being fitted in the circuit arrangement in place of the inductive element L selected in accordance with the invention. Toroidal core ferrite inductors of this kind are used to reduce electromagnetic disruptions during the steady-state operation of the lamp. This also clearly shows that standard toroidal core ferrite inductors of this kind, which are normally fitted into the return conductor to improve the EMC characteristics, are not suitable for preventing the problem of the glitch pulse, due to their saturation characteristics. What can particularly be seen from FIG. 6a is that the voltage value at the terminal $x_2$ that is most heavily loaded can reach high levels. The voltage at this point may easily exceed a value of 1000 volt for a brief period.

Figure 5:
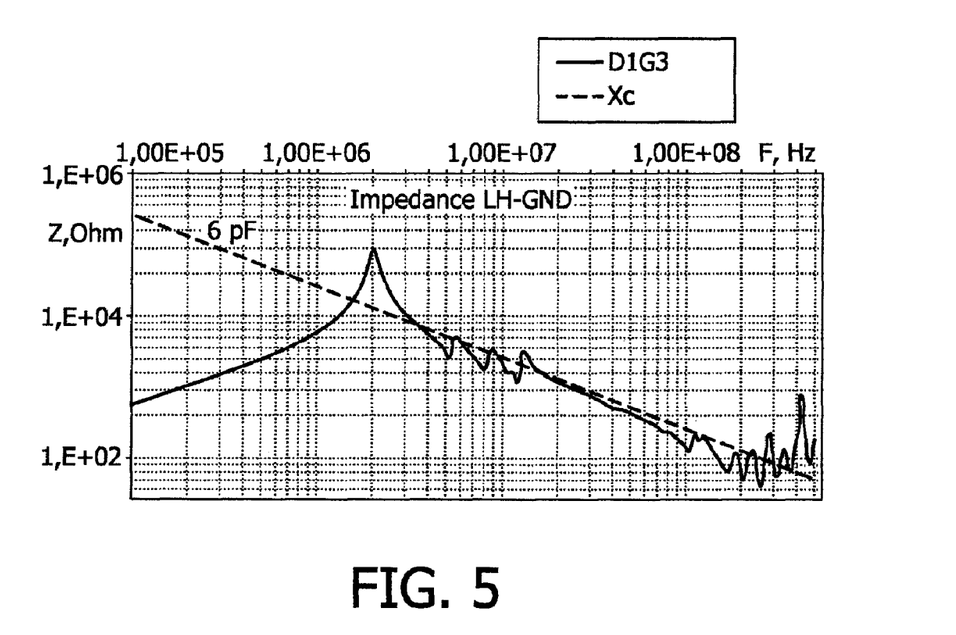
FIG. 5 shows the results of a measurement of impedance as a function of frequency on a circuit arrangement as shown in FIG. 2.

The sum of the magnitudes of the two parasitic capacitances was also estimated with an impedance analyzer. For this purpose, the terminal $x_1$, $x_2$ and $x_4$ of the circuit 1 were connected to the lamp shield by 50Ω resistors. The impedance between the high-voltage terminal of the secondary winding $T_S$ of the transformer T and the shield S was measured with the lamp 2 removed. The results of the impedance measurements in a frequency range up to 500 MHz are shown in FIG. 5. A straight line represents the impedance of an ideal capacitor of 6 pF. The measurements show that the total parasitic capacitance of the igniter circuit arrangement 1 is of the order of 6 pF. This capacitance of 6 pF, in conjunction with the extraordinarily fast change in potential of $10^{13}$ volt/s, is able to cause current pulses of the order of a few tens of A.

The potential risk that the glitch pulses represent for the ballast 5 depends in this case not only on the maximum current or the maximum voltage but also, and to a very substantial degree, on the value dI/dt of the rise in the current of the pulses, i.e. in particular on the shape of the rising edge.

By using an inductive element L having an inductance $L_i$ in the circuit (while taking the total disruptive capacitance $C_P$ into account), it can be ensured that what occur instead of the fast glitch pulses are resonant oscillations having a half-cycle $$\tau = \pi\sqrt{L_i C_P}.$$

For an igniting voltage U, there also then occur maximum currents of a magnitude of $$I = U\sqrt{\frac{C_P}{L_i}}.$$

What this means is that, as a result of the introduction of the inductive element according to the invention, the rising edges and the amplitude of the glitch pulse can be controlled in such a way that the pulse does not have any adverse effect on the ballast, in that it is ensured that the oscillations are slower that the original glitch pulse and in particular have less steep rising edges.

Figure 6B:
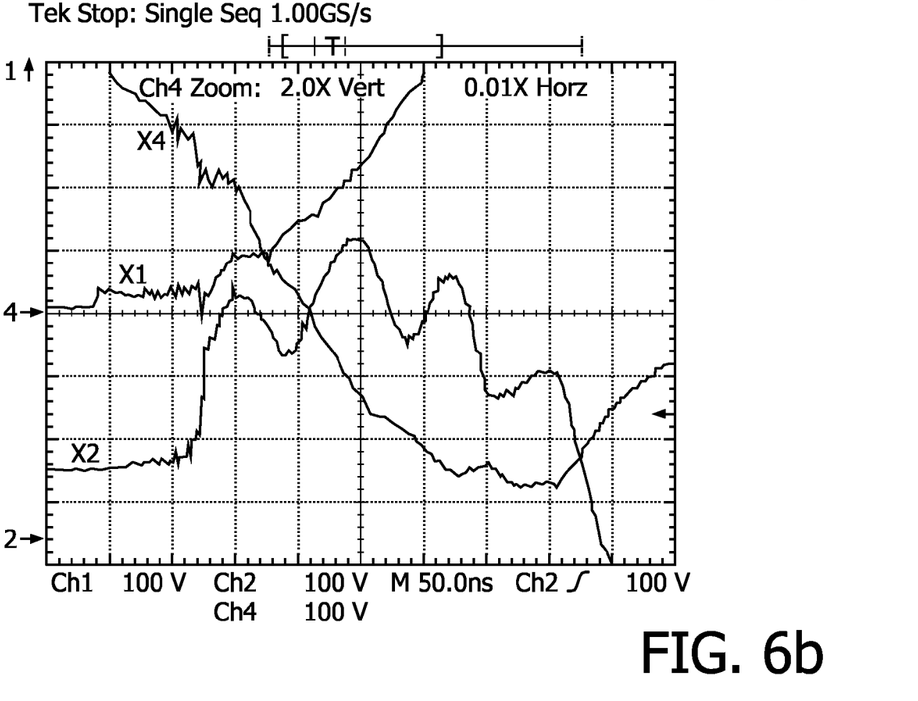
FIG. 6b is a measurement for comparison with FIG. 6a after the circuit arrangement has been modified in accordance with the invention, as shown in FIG. 2, with a 20 µH rod core inductor.

If the 6 pF measured is taken as a value for the parasitic capacitance $C_P$ and U=20 kV as an igniting voltage, then it follows from this that with an inductive element L having a inductance $L_i$=20 μH, pulses having a half-cycle length of approx. 35 ns and currents of approx. 11 A will be obtained, which are considerably below the values for the original glitch pulse. In FIG. 6b is shown a comparative measurement made for this purpose, in which a ferrite rod core inductor having an inductance of 20 μH was used, in accordance with the invention, as an inductive element L. A comparison with FIG. 6a will show that in this case the glitch pulse is now hardly discernable.

Figure 6C:
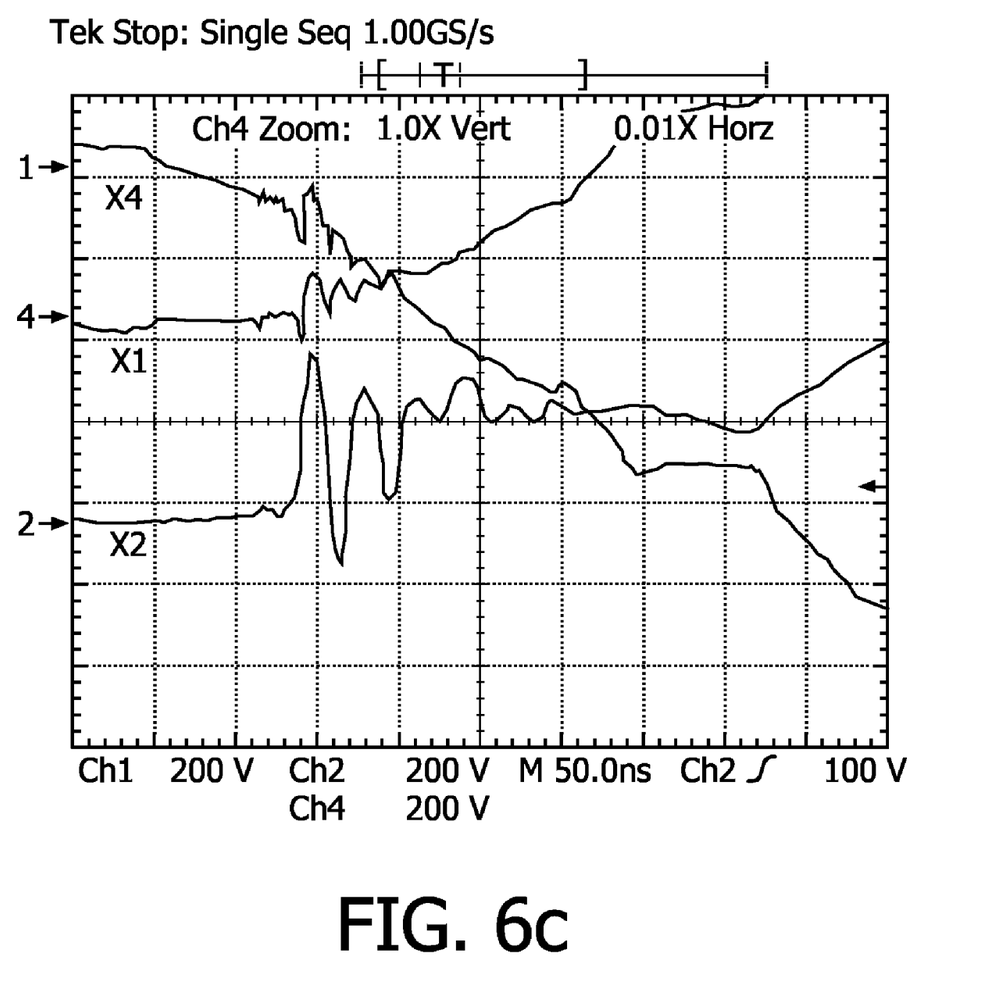
FIG. 6c shows the results of a measurement for comparison with FIG. 6a after the circuit arrangement has been modified in accordance with the invention, as shown in FIG. 2, with a 2.7 µH rod core inductor.

FIG. 6c shows a further measurement for comparison purposes where a ferrite rod core inductor having an inductance of 2.7 μH was used. This Figure clearly shows that even by this means the glitch pulse has already been made considerably less critical. The rising edges of the oscillations that occur in place of the glitch pulse are of a substantially more shallow slope.

The driver circuit may be designed in such a way that the resonant oscillations in the lamp circle have a half-cycle of 5 to 10 ns and no longer cause the ballast to fail, which means that an air core inductor or rod core inductor even of 1 μH can readily be used as an inductive element L. Preferably, the inductivity of the inductive element should be greater than approximately 0.1 μH.

The faster decay time of 5 to 10 ns with an inductor having an inductance of 1 μH as compared with 35 ns when using a 20 μH air core inductor or rod core inductor has the considerable advantage that there is a dramatic reduction in the likelihood of flashovers and other high-voltage effects from the return conductor to components present in the surroundings of the lamp. The use of inductive elements having an inductance of less than 5 μH is therefore an ideal compromise that ensures that neither the ballast nor other components situated in the surroundings of the lamp can be destroyed or damaged by the glitch pulses.

It is however essential in this case that either an air core inductor or a rod core inductor is used. A standard toroidal core inductor of a compact form having a small closed magnetic circuit, usually of ferrite, goes into saturation at high currents. When this happens the toroidal core inductor loses its inductive properties, which means that the filtering properties of such inductors are very much reduced.

Finally, it should once again be pointed out that the circuits and methods actually illustrated and described in the drawings and the description are merely illustrative embodiments that can be varied within a wide range by the person skilled in the art without thereby exceeding the scope of the invention. In particular, it is also possible not just for the inductor that is selected in accordance with the invention to be used to prevent the glitch pulse but also for one or more further, toroidal core inductors to be used, which inductors may for example be employed in addition to improve the EMC characteristics. In case these further inductors may go into saturation, they may in particular also have inductances of more than 20 μH, because, due to their saturation characteristics, these inductors will then not have any the effect on the glitch pulses.

For the sake of completeness, it should also be pointed out that the use of the indefinite article "a" or "an" does not rule out the possibility of the relevant features being present more than once.

The invention claimed is:

1. A circuit arrangement for operating a high-pressure gas discharge lamp, the circuit arrangement comprising:
    a voltage supply unit having a first terminal, a second terminal and a third terminal;
    an igniting-circuit circuit arrangement having a capacitor connected via the first terminal and the third terminal to the voltage supply unit, wherein the capacitor is connected in parallel with a primary winding of a transformer by a switching element, and
    a lamp-circuit circuit arrangement in which the high-pressure gas discharge lamp is connected on one side, via a secondary winding of the transformer, to the first terminal for connection to the voltage supply unit and on another side, via an inductive element, to the second terminal for connection to the voltage supply unit, the inductive element being formed by an air core inductor or rod core inductor having an inductance equal to or less than 20 μH, wherein the primary winding is directly connected to the secondary winding, and a zener diode or a further capacitor connected between the first terminal and the second terminal, wherein the capacitor has a capacitance value from $10^{-12}$ F to $10^{-9}$ F.

2. The circuit arrangement as claimed in claim 1, wherein the inductance of the inductive element is less than approximately 5 μH.

3. The circuit arrangement as claimed in claim 1, wherein the inductive element is formed by the rod core inductor having a rod core of ferrite.

4. A lamp unit having a high-pressure gas discharge lamp and having a circuit arrangement as claimed in claim 1.

5. The lamp unit as claimed in claim 4, wherein a bulk of the circuit arrangement is incorporated in a base-housing of the high-pressure gas discharge lamp.

6. The lamp unit as claimed in claim 4, wherein the inductive element is incorporated in a return conductor that runs to the base-housing from an electrode of the high-pressure gas discharge that is arranged remotely from the base-housing.

7. A headlight having a lamp unit as claimed in claim 4.

8. A method of operating a high-pressure gas discharge lamp comprising the acts of:
    providing a voltage supply unit having a first terminal, a second terminal and a third terminal;
    connecting the high-pressure gas discharge lamp between the first terminal and the second terminal;
    in a steady-state mode, supplying an operating voltage to the high-pressure gas discharge lamp by the voltage supply unit via a lamp-circuit circuit arrangement in which the high-pressure gas discharge lamp is connected in series with a secondary winding of a transformer;
    connecting a capacitor to the voltage supply unit between the first terminal and third terminal, wherein the capacitor is connected in parallel with a primary winding of the transformer via a switching element to form an igniting-circuit circuit arrangement;
    directly connecting the primary winding to the secondary winding;
    igniting the high-pressure gas discharge lamp by inducing a high-voltage pulse in the secondary winding by charging the capacitor; and
    connecting an inductor into the lamp-circuit circuit arrangement to reduce a transient pulse that places a load on the voltage supply unit, wherein the inductor is connected to a side of the high-pressure gas discharge lamp opposite to the secondary winding for being connected in series with the secondary winding of the transformer and with the high-pressure gas discharge lamp, and wherein the inductor has an inductance equal to or less than 20 μH, and connecting a zener diode or a further capacitor between the first terminal and the second terminal, wherein the capacitor has a capacitance value from $10^{-12}$ F to $10^{-9}$ F.

9. The circuit arrangement of claim 1, wherein the voltage supply unit comprises a ballast.

10. The circuit arrangement of claim 1, wherein the inductance of the inductive element is less than approximately 1 μH.

11. The circuit arrangement of claim 1, wherein the inductive element is configured to not go into saturation at increased current through the lamp.

12. The circuit arrangement of claim 1, wherein the inductance of the inductive element reduces disruptive effect of parasitic capacitances of the circuit arrangement.

13. The circuit arrangement of claim 12, wherein the parasitic capacitances include a first parasitic capacitance between the secondary winding to the high-pressure gas discharge lamp, and a second parasitic capacitance parallel to the secondary winding.

14. The method of claim 8, wherein the inductor comprises an air core inductor or a rod core inductor.

* * * * *